UNITED STATES PATENT OFFICE.

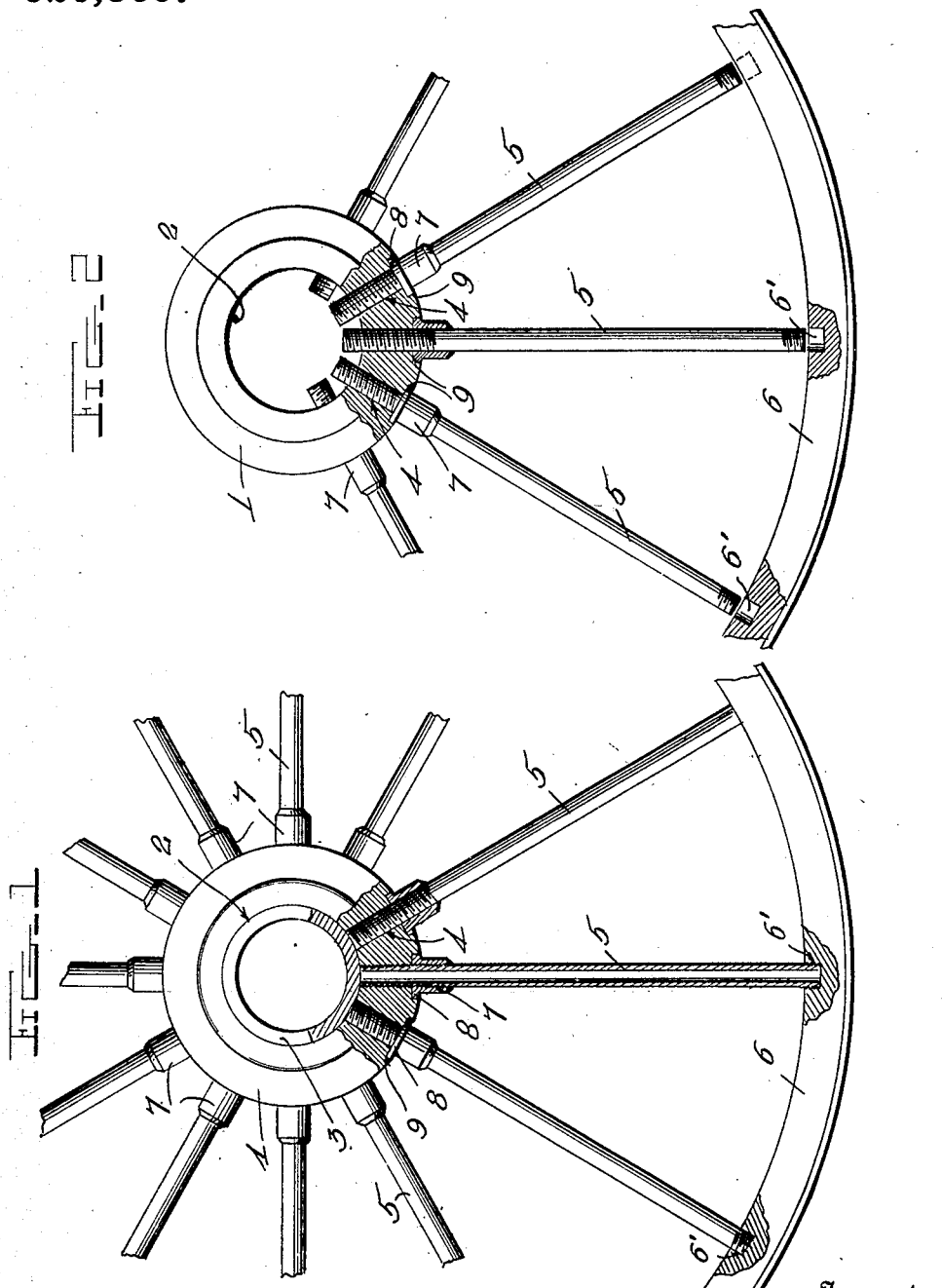

WILLIAM FLYNN, OF NASHVILLE, TENNESSEE.

WHEEL.

No. 920,309.  Specification of Letters Patent.  Patented May 4, 1909.

Application filed January 23, 1908. Serial No. 412,331.

*To all whom it may concern:*

Be it known that I, WILLIAM FLYNN, a citizen of the United States, residing at Nashville, in the county of Davidson and State of Tennessee, have invented certain new and useful Improvements in Wheels; and I do declare the following to be a full, clear, and exact description of the invention, such as will enable others skilled in the art to which it appertains to make and use the same.

My invention relates to wheels. And especially to means for securing the spokes of metallic wheels.

The object of the invention is to provide a rigid spoke from one end to the other, and to securely attach it to the hub and felly.

A further object of the invention is to cheapen the construction of metallic wheels and at the same time to provide a wheel which may have its broken parts replaced or repaired at a nominal cost and in a short period of time.

In the drawings, Figure 1 is a side elevation of the wheel partly in section, Fig. 2 is an enlarged detail section showing the spoke projecting into the skein opening.

Referring more especially to the drawings, 1 represents the hub which is centrally apertured at 2 to receive the skein 3 as is usual. Extending radially from the center of the hub are a plurality of spoke apertures 4, which are threaded throughout their length to receive the tubular metallic spokes 5, which have a threaded connection with the hub at one end, and are threaded into the felly 6 at the other end and these apertures 4 are enlarged at their outer ends to form circular depressions or recesses as 9 for a purpose to be described. The threads shown at 6' are probably a quarter or one-half inch long and the threaded aperture into which these threads take is of approximately the same depth. The threads at the opposite end of each spoke, or those which enter the hub are extended some distance along the spoke to receive a combined strengthening sleeve and clamping nut 7, which has an enlarged head 8 adapted to enter one of the circular recesses 9 in the hub and the walls of this recess brace the sleeve against lateral strain thereby avoiding danger of the spokes breaking off at the periphery of the hub.

By referring to Fig. 2 it will clearly be seen how the spoke is applied to the hub and to the felly. It is first threaded into the aperture 4 of the hub so that its inner end projects into the skein opening, (the skein being removed). After all of the spokes are in this position they are each backed out of the hub so that the threaded portion 6' will take into the felly. The clamping nut 7 is then secured against the hub to prevent any movement of the spoke, and the skein is then placed in position.

Many modifications may be resorted to in practice and I desire it understood that such modifications are contemplated by me, and are considered to be within the scope of appended claim.

Having thus described my invention, what I claim and desire to secure by Letters-Patent is:—

In a wheel, the combination of a hub having a plurality of radially extending apertures with recesses forming seats at the outer ends of said apertures, a felly having a plurality of spoke sockets, spokes extending into said hub apertures and felly sockets, sleeves on said spokes extending beyond said hub and having enlarged heads resting in the recesses of the hub, the walls of said recesses serving to brace the sleeves against lateral strain, and means for locking said spokes against longitudinal movement.

In testimony whereof I have hereunto set my hand in presence of two subscribing witnesses.

WILLIAM FLYNN.

Witnesses:
 E. EDMONSTON, Jr.,
 L. O. HILTON.